United States Patent [19]

Vogt et al.

[11] Patent Number: 4,853,525

[45] Date of Patent: Aug. 1, 1989

[54] FORGERY PROOF OPTOELECTRIC CODE CARD READER

[75] Inventors: Werner Vogt, Remetschwil, Switzerland; Anton Schuhwerk, Geislingen, Fed. Rep. of Germany

[73] Assignee: Interflex Satensysteme GmbH, Stuttgart, Fed. Rep. of Germany

[21] Appl. No.: 113,653

[22] Filed: Oct. 28, 1987

[30] Foreign Application Priority Data

Oct. 30, 1986 [DE] Fed. Rep. of Germany ....... 3636921

[51] Int. Cl.⁴ .............................................. G06K 7/12
[52] U.S. Cl. .................... 235/469; 235/454; 235/488; 250/569
[58] Field of Search ............... 235/454, 455, 466, 468, 235/469, 470, 474, 488; 250/556, 557, 566, 568, 569

[56] References Cited

U.S. PATENT DOCUMENTS

| | | | |
|---|---|---|---|
| 3,836,754 | 9/1974 | Toye et al. | 235/469 |
| 4,298,792 | 11/1981 | Granholm et al. | 235/474 |
| 4,436,991 | 3/1984 | Albert et al. | 235/468 |
| 4,544,836 | 10/1985 | Galvin et al. | 235/488 |
| 4,605,846 | 8/1986 | Duret et al. | 235/468 |

FOREIGN PATENT DOCUMENTS

| | | |
|---|---|---|
| 2559430 | 5/1977 | Fed. Rep. of Germany . |
| 2553811 | 6/1977 | Fed. Rep. of Germany ...... 235/468 |
| 2747076C3 | 4/1979 | Fed. Rep. of Germany . |
| 2843462C2 | 4/1980 | Fed. Rep. of Germany . |

Primary Examiner—A. D. Pellinen
Assistant Examiner—H. L. Williams
Attorney, Agent, or Firm—Darby & Darby

[57] ABSTRACT

A forgery-proof optoelectric card system is disclosed which includes a reader and code card comprising invisible light and dark codings forming at least one reading track. At least one reading head is provided which may comprise a photodiode as a ligh source and a phototransistor as a light receiver. The light codings having a first pass band to infrared light. Superimposed over selected ones of said light codings are filters having an attenuation band that is narrower than and lies within the pass band of the light codings. Additionally, a secondary light receiver responsive only to light lying within the attenuation band of the filter is provided.

13 Claims, 2 Drawing Sheets

FORGERY PROOF OPTOELECTRIC CODE CARD READER

BACKGROUND OF THE INVENTION

The present invention relates generally to a forgery-proof code card reader and, more specifically, to code cards of the type that include invisible light and dark codings which are permeable to a selected light band. Although the invention is described in connection with optoelectric code cards, it may be used in connection with other code cards such as magnetic stripe code cards of the like.

There have been known optoelectric code car above type (German Patent Specification No. 27 47 076; German Patent Specification No. 28 43 462) where invisible and/or semi-transparent or slightly transparent reading tracks are provided which are read out by special reading heads each comprising a, preferably, pulse-driven photodiode as a light source and a phototransistor as a receiver, with the card being moved relative thereto. These systems operate preferably with infrared light, if only to improve the protection from forgery, so that such code cards are widely in use in particular as credit cards, check cards, personal identification cards, and the like. It is a common feature of all the optoelectric code card readers known for reading such code cards that the reading tracks and the clock marker tracks, if any, of the code cards are scanned with the card being either moved relative to the reading heads or being stationary, that the data information so obtained, which is offered mostly serially, but sometimes also serially in parallel bit packets, is then evaluated whereupon access to a building is provided, a certain activity is authorized, for example the payment of a certain amount of money, or —to say it in more general terms—a generally permitted manipulation on the part of the carrier of the card is no longer hindered.

A particular problem of these code cards lies in the difficulty of protecting them from forgery, since it must of course be ensured that any abuse of such code cards is excluded.

Although it has been known in this connection to provide certain cards, for example credit cards, with a magnetic track on their reverse side containing certain data information, this provides, however, the problem that the magnetic track may get lost if it gets into contact with strong static magnetic sources, or that it may be detected by corresponding measuring instruments if the card gets into the hands of an unauthorized person, if only for a short time.

In the case of another known device (German Disclosure Document No. 25 59 430) it is part of the checking procedure of such identity documents that during the reading process at least one photodiode operates also in pulse operation, with the light sources switched on. This is necessary for safety reasons because this pulse operation permits an additional phenomenon to be utilized as a recognition aid. The latter consists in compounds of special earths being arranged in the code card itself as special check substances which offer the particularity that pulsating light impinging upon them is reflected or permitted to pass with a given time lag. A properly time-adjusted pulse oscillator then permits to utilize these time lags as an additional identification feature. However, it is necessary for this purpose that the code card be at rest, i.e. static, during reading. If in the case of the reading principle just described reading were effected dynamically, i.e. with the card moving, then the card would have to be moved through the feeding channel at a precise speed because otherwise it would be impossible to tune the system to the time lag of the light pulses specific for the given check substances. On the other hand, if the reading operation were carried out statically, the code card would have to be positioned precisely in the reading channel which would require high production precision, not only as regards the guide elements in the channel, but also as regards the dimensions of the card. And this would also mean that the card would have to be kept free from any external mechanical deformation and damage and that a damaged card would no longer be acceptable in use.

The described known checking principle is complicated, it requires the arrangement of specific compounds in the card, which is rather troublesome, and it is in addition dependent on certain external, reproducible reading conditions which must be produced with a corresponding accuracy. Further, it is a requirement of this known checking principle that the card must be clear-transparent at the point where the so-called check substance is arranged, that only light of a given wave length is used, which is not always guaranteed by aging photodiodes, and that at least the point where the check substance is arranged must always be kept clean because otherwise reading errors are unavoidable.

Now, it is the object of the present invention to make an optoelectric code card reader and the associated code card highly forgery-proof, without great input, by detecting special properties of the code card related to its light-permeability with the aid of special, properly tuned sensors arranged in the area of the reader and verifying in this manner the general permissibility of the card.

ADVANTAGES OF THE INVENTION

The invention solves this object with the aid of the characterizing features of the main claim and provides the advantage that a negative property regarding the light-permeability of the code card, preferably a so-called infrared-negative window which may, basically, be applied in any desired geometrical distribution, as a mask or the like, over the whole card format, but which is preferably provided in the area of the data and clock marker tracks, is adapted to particular positions and properties of at least one additional light receiver in the area of the code card reader so that the zero signal appearing at the output of this additional light receiver when light impinges upon such a negative window can be identified as indicating that the code card is good or correct.

These two mutually adapted properties of the code card and/or the code card reader can then be combined in any desired manner with the intelligence of the evaluation circuit, for example so that the at least one additional light receiver must "see" a zero signal when certain data or clock signals occur or, when several such additional light receivers are provided in corresponding geometrical distribution, that such signals must occur in a specific sequence, in corresponding serial or parallel bit words, during introduction or, more generally, during reading of the card. If, for the sake of better understanding, we now regard a particular embodiment of the invention, it can be noted that the code card may be provided, for example in the area of clock or data tracks to be read out, with an additional specific film which suppresses practically completely any IR light within a given, preferably narrower wave length range, i.e. which is opaque or non-transparent to this, but only to this range. One obtains in this manner an infrared-negative window of a given wave length range, for example in the area of one data track, and for example continuously for this track. In addition to the normal IR light receiver, for example a phototransistor, provided for scanning this data track there is provided the additional light receiver, in the form of another phototransistor, either in close neighborhood to the first transistor or in any desired position, but in any case so that it is directed towards this data track. This additional light receiver is, however, designed in such a manner that it responds exclusively to light in the IR wave length range which is suppressed by the additional film. It is understood in this connection that instead of providing a film, the transparent areas of the code card may be designed also in any other manner which provides the necessary negative selectivity regarding the before-mentioned wave length range.

It is then the basic operating principle during reading of the card that every time a signal is received, due to the coding, and transmitted by the normal data or clock track reading head, the additional light receiver cannot supply a signal because the film suppresses the IR light in the wave length range which is the only one that can be received by it. To say it in more general terms, one therefore obtains a zero signal at the output of this additional photo sensor every time an L signal is obtained at the normal light sensor reading the data track (the signals can be designated also as logic zero=log 0 or logic one=log 1).

This basic principle as such is already extremely forgery-proof because any attempt to blacken the code card so that the additional—in the present case the special—light sensor does not receive any light so that it supplies a log 0 signal, must necessarily fail since any blackening would have to be applied in the area of a data or clock marker track so that it would also cover up the latter, and consequently the normal light sensor would of course also no longer receive any light. Under these circumstances, the card would be rejected immediately.

Any attempt at manipulating the reader itself—which cannot be excluded under certain circumstances, when the reader is accessible—for example by blackening or covering up the additional light sensor, can also be countered without any problems by providing corresponding peripheral circuits or by a correspondingly intelligent evaluation circuit, for example a microprocessor or minicomputer, or the like, if the evaluation circuit is conditioned in such a manner that the additional light sensor must see light at least once at the beginning of the introduction of the card (which means that no selective film with an infrared-negative window is provided at this point). This single light pulse to be received by the additional IR sensor may also be utilized for activating the whole circuit so that it will then simultaneously perform the function of an activator which would of course not be fulfilled if the whole sensor were blackened, with the consequence that the card would be rejected.

The following considerations are intended to illustrate the basic idea of the present invention: It might seem to suggest itself to make use of materials responding to selective wave lengths, for example and of course in particular in the infrared range, for configurating the reading tracks, i.e. the clock or data tracks, on the code card. This is, however, of no use because light sensors used for evaluating the codings in the clock and data tracks, which respond to these special wave length ranges, will of course also respond every time they are irradiated with normal light in the IR range because in this case at least the sector to which they respond will also be contained in this light. Accordingly, a comparison of the type used by the present invention must be performed insofar as the transparent area of the reading tracks must permit reading-out by particular reading heads, while at the same time additional light sensors assume the output signal zero, preferably only in given geometrical areas and positions and, preferably, adapted to the reading process itself, which can be detected without any problems by the intelligence of the succeeding evaluation circuit.

The invention makes use for this purpose of the principle that it is not possible, at least not normally, to read out and not to read out at the same time, which means that there do not exist any possibilities to by-pass or to outwit the forgery-proof system according to the invention. In fact, by coordinating the infrared-negative window in the code card with the additional light sensor responding selectively to this window, with maximum sensitiveness, the invention actually permits, in spite of what has been said above, to read out—by means of the normal IR sensors—and not to read out—by means of the additional light sensor exhibiting the narrow positive window for IR radiation—at the same time and at the same point, i.e. in the transparent areas of the reading tracks. The combination of these two results is guaranty for the good condition of the code card to be read out.

The features specified in the sub-claims permit advantageous improvements and further developments of the forgery-proof optoelectric code card reader defined by the main claim. A particularly advantageous solution is seen in a very simple implementation using an additional film having the special characteristics of the infrared-negative window which film, basically, only has to be added to the various layers forming the code card during lamination thereof, if desired only in the area of the reading and data tracks. Otherwise, the expense can also be kept low and may be limited to the additional arrangement of at least one additional light sensor comprising a special IR-positive window, which light sensor then has to be evaluated additionally. If certain other relations and combinations with the reading process and in connection with the evaluation of the signals applied by the additional light sensor are desired, this can be arranged in the evaluation circuit without much input because the evaluation circuit consists advantageously and usually of a microprocessor or a minicomputer so that these features can be incorporated via the software, by corresponding programming.

BRIEF DESCRIPTION OF THE DRAWING

One embodiment of the invention will be described hereafter with reference to the drawing in which.

DESCRIPTION OF THE EMBODIMENTS

It is the basic concept of the present invention to ensure, by relating in a suitable manner infrared-negative windows arranged in the area of transparent reading-track sections of the code card on the one hand with infrared-positive windows in the area of at least one additional light sensor on the other hand, that the card can be checked for a property which cannot be falsified without destroying the card, the method being based on opposed capabilities exercised during the reading process, namely the simultaneous recognition and non-recognition of the transparent code track sections.

It is assumed for the purposes of the following description that the basic structure of optoelectric code card readers are known, as are certain additional capabilities required for reading out moving cards, for example detecting and evaluating clock tracks in such a manner that the code card reader itself knows at any time the position the card has reached in the reading process, or if the card is introduced further or retracted or if vibrating movements are performed. In this connection, reference is made once more to the two German Patent Specifications Nos. 27 47 076 and 28 43 462 mentioned before.

Figure 1:
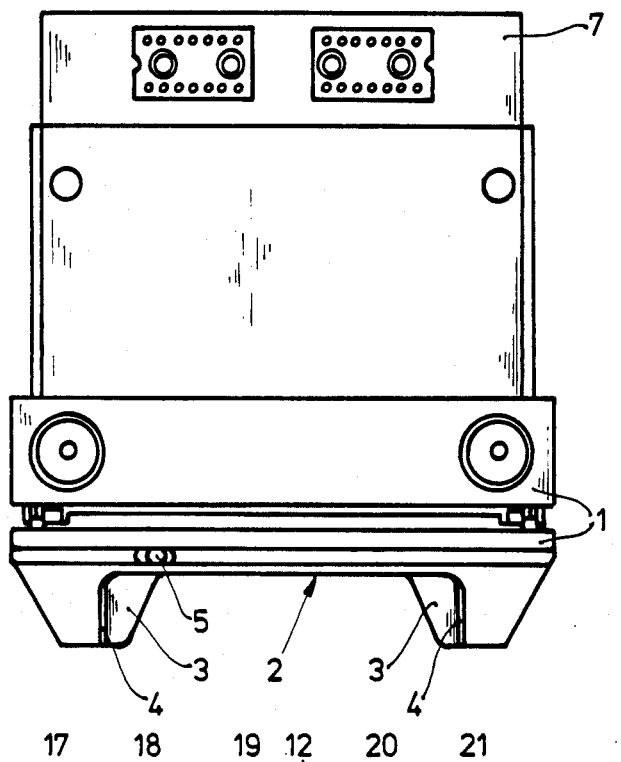
FIG. 1 shows a top view of one possible embodiment of a code card reader with card slot.

Accordingly, the basic design of the constructional parts of an optoelectric code card reader used in one possible embodiment can be described here very summarily. According to FIG. 1, the card reader comprises a front frame 1 with a card slot 2 and lateral guide surfaces 3 and 5 projecting from the front at the bottom. In addition, an error-indicating lamp 5 may be provided for indicating that an inadmissible or forged card has been introduced, in which case there may be a provision for drawing in the card.

Inside the card reader housing there are provided, in proper alignment with the reading tracks on the code card to be introduced, reading heads consisting of a light transmitter and light receiver and operating preferably in the infrared range so that they will be described hereafter only as IR luminous diode, as the light source, and as IR phototransistor, as the light receiver.

Figure 2:
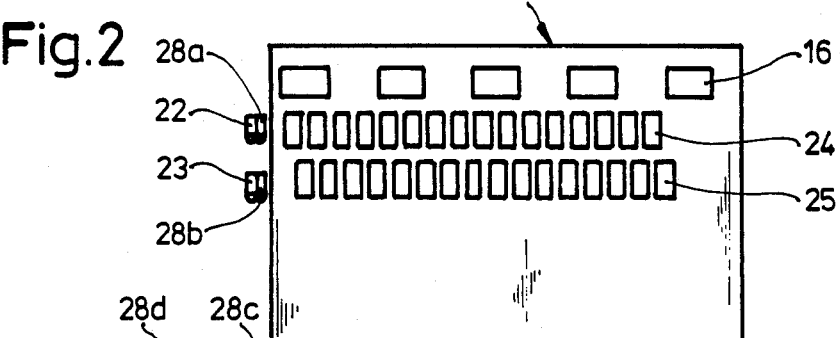
FIG. 2 shows a top view of a code card suited for carrying out the present invention, with the cover layer removed, so that the normally not visible distribution of clock and/or data tracks can be seen, with the light sensors serving to read out the card being arranged beside the card.

The code card 12 shown in FIG. 2 comprises in the conventional manner a stack of layers connected undetachably with each other, the upper and lower layers consisting, for example, of materials which are permeable exclusively to infrared light, and an inner layer serving as the code track carrier and consisting of an opaque material, i.e. one which is impermeable to light, and comprising the code markings, for example in the form of rows of rectangular sections which are permeable to light. As has been explained in particular in German Patent Specification No. 27 47 076, the square sections 17, 18, 19, 20 and 21 are clock track sections which are read out by reading heads LKI and LKII (see FIG. 3) arranged one behind the other, while the two remaining reading tracks 24 and 25 form two data tracks which are read out simultaneously, i.e. in parallel, by two related reading heads 22 and 23. From the illustration of FIG. 3 it appears that each reading head comprises an optical transmitter, preferably an IR luminous diode 26, and a light-sensitive receiver, preferably an IR phototransistor 27.

A simple first embodiment of the present invention may be designed in such a manner that the layers forming the code card lamination are supplemented by an additional film which may be generally transparent but exhibit a bend in the area of a predetermined wave length section, or only a predetermined wave length, approximated to the latter with the desired steepness, so that the IR light of this wave length, or in the range of this wave length, and, accordingly, in a predetermined range, is filtered out.

Figure 4:
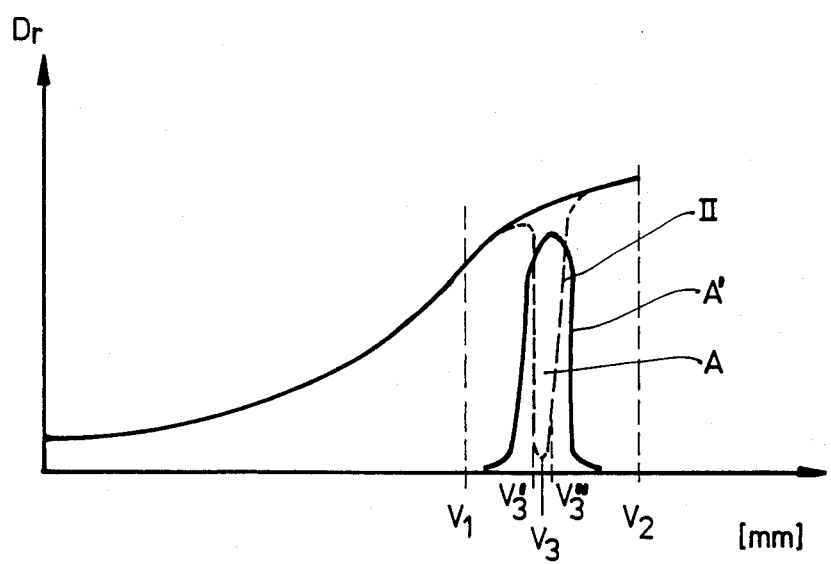
FIG. 4 shows, in diagrammatic form, the relative permeability to infrared light of an additional film with infrared-negative window used in this case, and the infrared-positive window of an additional light sensor provided for reading out the characteristics of this film.

The representation of FIG. 4 illustrates more clearly the meaning of the above. Normally, the material used, for example for the cover layers 13 and 15, exhibits its maximum relative IR permeability Dr between the wave lengths $v_1$ and $v_2$. The additional film exhibits a relative permeability Dr with a marked depression II indicated by dashed lines in FIG. 4 and forming a range about a wave length $v_3$. This IR-negative window, which extends approximately from wave length $v_3'$ to wave length $v_3''$ and which is designated by letter A, filters out, advantageously with the steepest possible flanks, mainly the IR light with wave lengths between $v_3'$ and $v_3''$.

This negative selectivity (infrared-negative window A) is more or less without importance for the normal process of reading out the clock and/or data tracks by means of wideband phototransistors 22, 23, 27, 27' which are sensitive to IR light, as sufficient light is detected for evaluation in the transparent area of the clock track 16 and the data tracks 24, 25.

Figure 3:
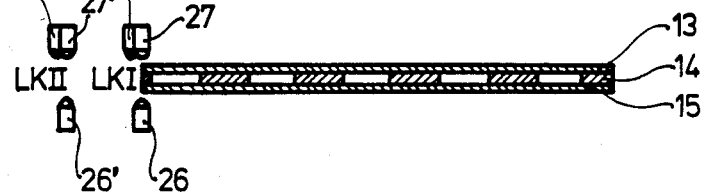
FIG. 3 shows a section through the code card of FIG. 2, along the clock track.

Due to the other partial feature of the present invention, namely to assign additional light sensors to the normal reading heads or—actually this is only necessary—to the light sensors, which reading heads are represented in FIGS. 2 and 3 simply adjacent the read-out IR phototransistors and are designated by reference numerals 28a, 28b, 28c and 28d (for irradiating these additional IR receivers no separate luminous diodes are normally required because the light generated by the luminous diodes of the reading heads which are anyway provided will be sufficient, at least when a direct geometrical relationship is established with the normal reading phototransistors) it is now possible to verify if the IR light is filtered by the respective infrared-negative window A, i.e. if it has been attenuated in this wave length range. Depending on the distribution of the film areas exhibiting the infrared-negative window (either over the whole surface, as in the case of the described embodiment, or only in predetermined geometrical patterns provided on the code card, which arrangement will be explained further below), the at least one additional IR light receiver (i.e. the phototransistor or phototransistors 28a, 28b, 28c, 28d) should now detect practically no light and, accordingly, supply a log 0 signal to the associated evaluation circuit. At the same time, the normal reading heads 22, 23, 27 and 27' will of course supply a log 1 signal during passage of the transparent sections of the code card, in the manner normal for such cards.

By combining the outputs of the normal read-out IR light receivers with the outputs of the additional IR light receivers—all of which are designed, as regards their receiving characteristics, in such a manner that they exhibit a maximum level of their light sensitivity when the impinging light is IR light of that wave length range in which the film exhibits its infrared-negative window A—one therefore obtains immediately the information that the code card checked is either good or a forgery. Such linking can be effected in the simplest of all cases by means of an AND gate whose one input is supplied with an inverted signal of the additional IR light receivers with positive IR window A', as can be seen best in FIG. 4.

It is not of importance in this connection that the additional light receivers 28a, 28b, 28c, 28d may under certain circumstances receive stray light or light from the neighborhood of its maximum sensitivity; this may be filtered out without any problem and in a simple manner by a subsequent threshold circuit or by other electric or electronic circuits restricting the receiving range of the additional light receivers substantially to the range of the infrared-negative window A of the film.

It is easily understood that the arrangement excludes any possibility of forgery; for if the reading tracks were to be manipulated, i.e. to be rendered impermeable to light, in order to comply with the requirements of the additional light receivers which must not receive any light during passage of the reading tracks through the reading heads, then the normal reading heads will also receive no light so that the card cannot be evaluated at all.

This basic inventive solution is susceptible of being modified in numerous ways. For example, the additional light receivers with their positive windows A' may be used simultaneously as activating sensors, in which case the area of the transparent sections is not provided with the infrared-negative window at the beginning, for example, so that the additional or special light receivers will initially receive light and thereby either activate or at any rate release the circuit for evaluation of the data, while further evaluation is permitted only after their signal has returned to log 0 during further passage of the data tracks.

Another advantageous embodiment of the present invention makes use of the clock-track evaluation system described by the two German patent specifications, in particular German Patent Specification No. 28 43 362, which provides that the reader is always informed up to which reading step the code card has been introduced. One now distributes the infrared-negative window A geometrically in the transparent reading track areas, in accordance with this information, for example so that the additional light receiver actually receives light every third clock step, which means that every third step no filtering is effected by the infrared-negative window A. Basically, it is even possible in this manner to provide the code card with complete patterns or even illustrations or drawings, by this negative-and-positive window system. It should be noted in this connection that the windows need not necessarily be formed by inserting an additional film into the code card lamination, but that the layers which are permeable to infrared light may themselves exhibit a corresponding selectivity for the infrared-negative window, and this of course also in the desired geometrical or time-related distribution.

All the features that have been explained in the specification and that will be described in the following claims and in the drawing may be essential to the invention either alone or in any desired combination thereof.

We claim:

1. A forgery-proof optoelectric card system including a reader and code cards comprising invisible light and dark codings forming at least one reading track arranged between two cover plates which are permeable to infrared light, said light codings being permeable to infrared light and said dark codings blocking infrared light, and having at least one reading head comprising a photodiode as a light source and a phototransistor as a light receiver, said reading head being arranged in a card-guiding channel of said reader and positioned to read at least one reading track arranged on the code card to be evaluated, supply and evaluation means connected to said reading head for evaluating the information read thereby, characterized in that superimposed over selected ones of said light codings are filters having infrared attenuation characteristics narrower than and lying within the infrared pass band of said light codings, and a secondary light receiver responsive only to light lying within the attenuation band of said filters.

2. Forgery-proof optoelectric code card reader according to claim 1, characterized in that the light received by the light receivers of the at least one reading head is infrared light and that the light received by the at least one secondary light receiver and the filters of the code card are likewise in the infrared range.

3. Forgery-proof optoelectric code card reader according to claim 2, characterized in that the reading-track comprises sections of clock tracks and/or data tracks.

4. Forgery-proof optoelectric code card reader according to claim 1, characterized in that a plurality of infrared (IR) light receivers (28a–28d) are provided and arranged in such a manner that during passage of the code card through the reader, they coincide at least transitorily with said light codings of the code card which comprise the infrared-permeable area.

5. Forgery-proof optoelectric code card reader according to claim 3, characterized in that the secondary light receiver receives IR light within its receiving range at least at the beginning of the reading process, and that it acts as activating means for the reading process, and that it acts as activating means for the reading process, and the evaluation of the clock and data tracks before any filter interacts with it.

6. Forgery-proof optoelectric code card reader according to any of claims 2 to 6, characterized in that the filters are distributed in the light codings of the code card according to a predetermined geometrical pattern.

7. Forgery-proof optoelectric code card reader according to claim 3, characterized in that in the case of readers which are informed of the respective position of the card to be read out through the course of a clock track, predetermined transparent areas of the clock track and/or the data track and/or other parts of the code card permeable to IR light do not exhibit the said selective filtering means and are thus permeable to IR light whose wave length is within the positive receiving window of the at least one additional light receiver.

8. Forgery-proof optoelectric code card reader according to claim 7, characterized in that the distribution of the transparent areas of the code card that are filter-free follows a predetermined pattern which is stored in the area of the evaluation circuits for the output signals of the at least one additional light receiver, in coordination with the position-recognizing system using the clock-track distribution.

9. A forgery-proof card system including a reader and code cards comprising individual first and second codings, said first coding having a first signal pass band for passing signals lying within said band, said second codings having an attenuation band coinciding with said first pass band, at least one reading head being responsive to signals lying within said first pass band, and positioned on one side of said code card, a signal generator for generating signals lying within said first pass band on the other side of said card, filters superimposed over selected ones of said first codings and having a filter attenuation band that is narrower than and lies within said first pass band, and a secondary receiver positioned on said one side of said card and responsive only to signals lying within the filter attenuation band.

10. A forgery-proof card system as in claim 9, in which said signals are light signals.

11. A forgery-proof card system as in claim 10, in which said light signals are in the infrared range.

12. A card for a forgery-proof system comprising individual first and second areas forming at least one reading track, said first area having a pass band for passing signals lying within said pass band, said second area attenuating signals lying within said first pass band, and filters superimposed over preselected ones of said first areas, said filters having an attenuation band that is narrower than and lies within said first pass band.

13. A card as in claim 12, in which said first pass band lies within the infrared region.

* * * * *